US009417106B2

(12) United States Patent
Tobita

(10) Patent No.: US 9,417,106 B2
(45) Date of Patent: Aug. 16, 2016

(54) WEARABLE COMPUTING DEVICE

(71) Applicant: Sony Corporation, Tokyo (JP)

(72) Inventor: Hiroaki Tobita, Paris (FR)

(73) Assignee: Sony Corporation, Tokyo (JP)

( * ) Notice: Subject to any disclaimer, the term of this patent is extended or adjusted under 35 U.S.C. 154(b) by 628 days.

(21) Appl. No.: 13/891,682

(22) Filed: May 10, 2013

(65) Prior Publication Data

US 2013/0311132 A1    Nov. 21, 2013

(51) Int. Cl.
*G01D 21/00* (2006.01)
*G01B 21/16* (2006.01)
*G01S 19/42* (2010.01)
*A61H 3/06* (2006.01)
*G01C 21/20* (2006.01)
*A41G 3/00* (2006.01)

(52) U.S. Cl.
CPC ............. *G01D 21/00* (2013.01); *A61H 3/061* (2013.01); *G01B 21/16* (2013.01); *G01C 21/20* (2013.01); *G01S 19/42* (2013.01); *A41G 3/00* (2013.01); *A61H 2003/063* (2013.01); *A61H 2201/1604* (2013.01); *A61H 2201/165* (2013.01); *A61H 2201/5002* (2013.01); *A61H 2201/5015* (2013.01); *A61H 2201/5097* (2013.01)

(58) Field of Classification Search
CPC ........ G01D 21/00; G01B 21/16; G01C 21/20; A41G 3/00; A61H 2201/1604; A61H 2201/5002; A61H 2201/5097; A61H 3/061; A61H 2003/0063; A61H 2201/165; A61H 2201/5015; G01S 19/42
USPC ............. 702/150, 189; 348/376, 3.6, E7.001; 600/544, 383, 545, 201; 709/201
See application file for complete search history.

(56) References Cited

U.S. PATENT DOCUMENTS

| 4,809,690 A * | 3/1989 | Bouyssi | A42B 1/08 128/857 |
| 5,279,305 A * | 1/1994 | Zimmerman | A61B 5/0006 128/903 |
| 8,473,024 B2 * | 6/2013 | Causevic | A61B 5/0006 600/383 |

(Continued)

FOREIGN PATENT DOCUMENTS

KR    10-2009-0101378    9/2009

OTHER PUBLICATIONS

U.S. Appl. No. 61/520,375 Specification; Human Environment Life Logging Assistant Virtual Esemplastic Network and System by Inventors Kenneth I. Ritchey and Kurtis J. Ritchey 26374 Tonganoxie Road, Leavenworth, Kansas 66048, USA PH: 913-727-2266, E-Mail: kritchey@lvnworth.com Finalized Provisional Patent Application on Jun. 7, 2011.*

(Continued)

*Primary Examiner* — Carol S Tsai
(74) *Attorney, Agent, or Firm* — Oblon, McClelland, Maier & Neustadt, L.L.P.

(57) ABSTRACT

Wearable computing device, comprising a wig that is adapted to cover at least a part of a head of a user, at least one sensor for providing input data, a processing unit that is coupled to the at least one sensor for processing said input data, and a communication interface that is coupled to the processing unit for communicating with a second computing device. The at least one sensor, the processing unit and the communication interface are arranged in the wig and at least partly covered by the wig in order to be visually hidden during use.

14 Claims, 4 Drawing Sheets

(56) References Cited

U.S. PATENT DOCUMENTS

| | | | |
|---|---|---|---|
| 9,101,279 B2* | 8/2015 | Ritchey | G03B 37/00 |
| 2007/0178950 A1 | 8/2007 | Lewis et al. | |
| 2008/0177197 A1* | 7/2008 | Lee | A61B 5/165 |
| | | | 600/545 |
| 2009/0054783 A1* | 2/2009 | Shibata | A61B 8/546 |
| | | | 600/459 |
| 2009/0164549 A1* | 6/2009 | Jung | G06Q 30/02 |
| | | | 709/201 |
| 2010/0016753 A1* | 1/2010 | Firlik | A61B 5/0006 |
| | | | 600/545 |
| 2011/0089207 A1 | 4/2011 | Tricoukes et al. | |
| 2012/0050144 A1 | 3/2012 | Morlock | |
| 2013/0064375 A1* | 3/2013 | Atkins | H04S 7/301 |
| | | | 381/17 |

OTHER PUBLICATIONS

U.S. Appl. No. 61/520,375 Drawings ; Human Environment Life Logging Assistant Virtual Esemplastic Network and System by Inventors Kenneth I. Ritchey and Kurtis J. Ritchey 26374 Tonganoxie Road, Leavenworth, Kansas 66048, USA PH: 913-727-2266, E-Mail: kritchey@lvnworth.com Finalized Provisional Patent Application on Jun. 7, 2011.*
"Nathalie's wearable breast! What is the breast to choose?", Hybrid Scrapyard workshop BLOG, May 28, 2008, 4 pages.
Carlos Merino-Garcia, et al., "A Head-mounted Device for Recognizing Text in Natural Scenes", 2011, 6 pages.
"GPS wearable Golf Cap", www.saganitech.com Document No. EMB012011, 2011, 1 page.
Kevin Warwick, "Cyborg 1.0", Wired, 8 (2), ISSN 1059-1028, 2000, 7 pages.

* cited by examiner

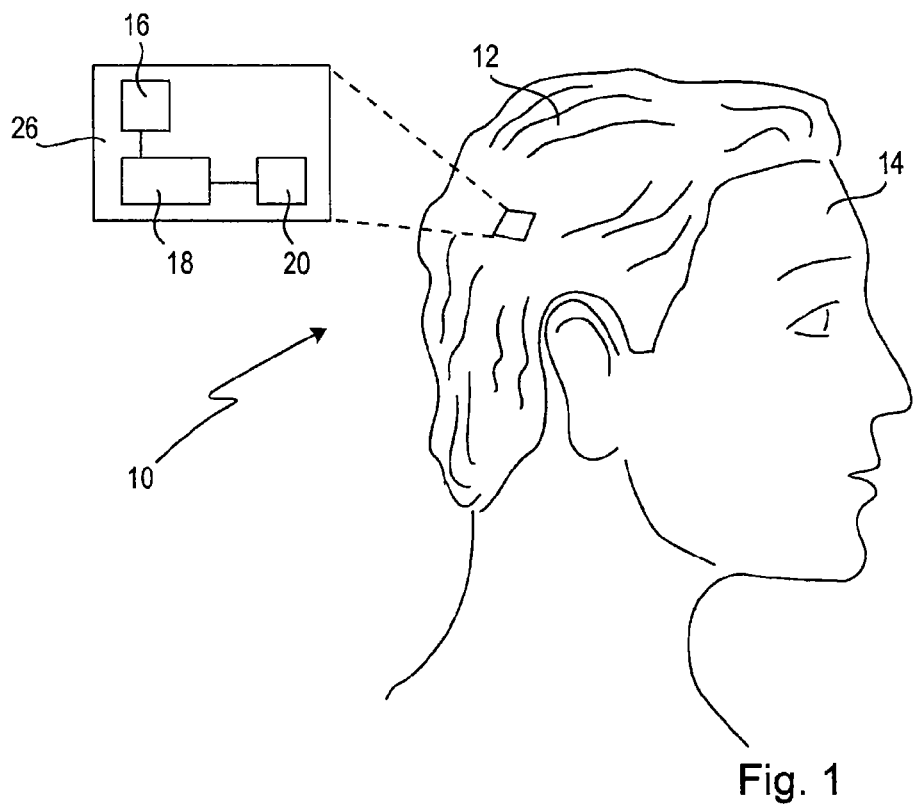
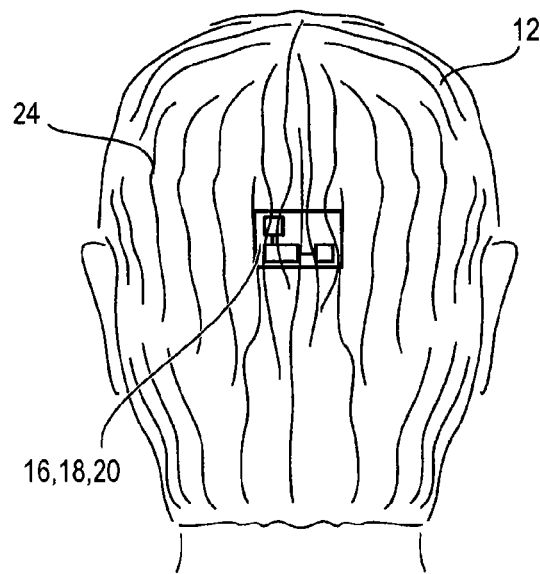
Fig. 1
Fig. 2

WEARABLE COMPUTING DEVICE

BACKGROUND

1. Field of the Disclosure

The present disclosure relates to a wearable computing device. Further, the present disclosure relates to a system comprising such a wearable computing device and a second computing device for transmitting and/or receiving control data to and/or from the wearable computing device, which second computing device is locally separated from the wearable computing device.

2. Description of Related Art

The continuous improvements in both software and hardware have led to the development of wearable computing devices. However, most known wearable devices have become neither common nor popular.

SUMMARY

It is an object to provide an improved wearable computing device and system including such a wearable computing device.

According to an aspect, there is provided a wearable computing device, comprising:
- a wig that is adapted to cover at least a part of a head of a user,
- at least one sensor for providing input data,
- a processing unit that is coupled to the at least one sensor for processing said input data, and
- a communication interface that is coupled to the processing unit for communicating with a second computing device,
- the at least one sensor, the processing unit and the communication interface being arranged in the wig and at least partly covered by the wig in order to be visually hidden during use.

According to a further aspect, there is provided a system comprising:
- a wearable computing device, including a wig that is adapted to cover at least a part of a head of a user, at least one sensor for providing input data, a processing unit that is coupled to the at least one sensor for processing said input data, and a communication interface that is coupled to the processing unit for communicating with a second computing device, the at least one sensor, the control unit and the communication interface being arranged in the wig and at least partly covered by the wig in order to be visually hidden during use; and
- the second computing device for transmitting and/or receiving control data to and/or from the wearable computing device, which second computing device is locally separated from the wearable computing device.

It is to be understood that both the foregoing general description of the disclosure and the foregoing detailed description are exemplarily, but are not restrictive, of the disclosure.

BRIEF DESCRIPTION OF THE DRAWINGS

A more complete appreciation of the disclosure and many of the attendant advantages thereof will be readily obtained, as the same becomes better understood by reference to the following detailed description when considered in connection with the accompanying drawings, wherein:

FIG. 1 shows a schematic side view illustrating an application of a first embodiment of a wearable computing device according to the present disclosure, FIG. 2 shows a schematic back view of an application of the first embodiment of the wearable computing device according to the present disclosure.

DESCRIPTION OF THE EMBODIMENTS

Figure 3:
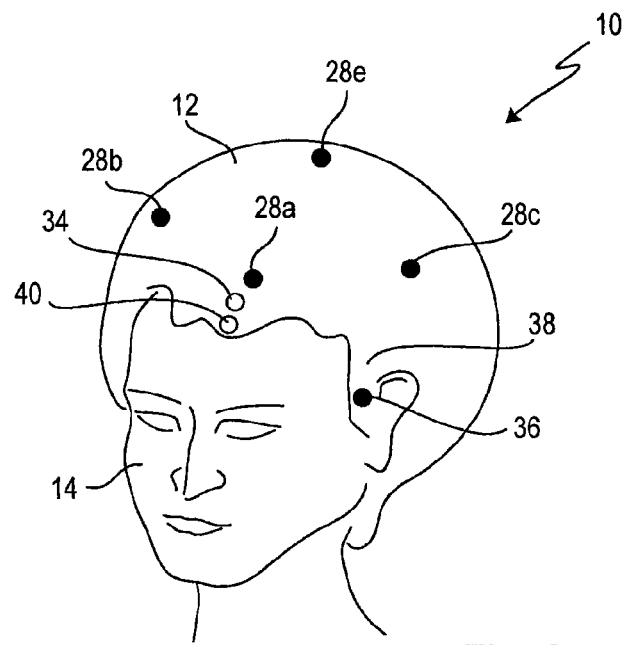
FIG. 3 shows a schematic perspective view illustrating an application of a second embodiment of the wearable computing device according to the present disclosure.

One of the aspects of the present disclosure is the usage of a wig and the integration of the components of the computing device into this wig. The usage of a wig has several advantages that, compared to known wearable computing devices, include a significantly increased user comfort and an improved handling of the wearable computing device. As the at least one sensor, the control unit and the communication interface are arranged in the wig, most of the components or all components of the wearable computing device are covered by the wig and are, thus, not visible. Therefore, the user can wear the wearable computing device as a regular wig while looking natural at the same time. Secondly, a wig covers at least a part of the user's head or the entire head of the user, so that there is enough space to place the components of the computing device, i.e. the at least one sensor, the control unit and the communication interface, without limiting the user in his daily life activities. The components of the computing device, i.e. the at least one sensor, the control unit and the communication interface, are preferably arranged within the wig in order to be placed on a peripheral area of the head when the wig is worn by the user. The wearable computing device can thus detect a wide variety of information.

A further advantage relies on the fact that the head area is more sensitive than other body parts, such as a foot, a hand or the waist of the user, where the wearable computing devices known from the prior art are usually arranged. The arrangement within a wig that is adapted to cover at least a part of the user's head enables the user to immediately react even if the computing device provides only small or weak feedbacks. The fact that users instinctively protect their heads more than other body parts is also advantageous, since more sensitive sensors and other computing components may be used without the risk of getting damaged. Moreover, the wearable computing device according to the present disclosure can be easily combined with other wearable devices, such as computer glasses or smart phones.

Finally, an integration of a computing device into a wig as proposed according to the present disclosure enables a usage in many daily life situations. The wig itself may have a fancy or funny appearance, but may also have an inconspicuous appearance so that other people in the surrounding of the user may not even take notice of the wearable computing device. In contrast to wearable computing devices known from the art, the wearable computing device proposed in this disclosure thus has the potential to become very popular and commonly used. The proposed device could even be used as a kind of combined technically intelligent item and fashion item at the same time.

Wigs are useful to enhance a user's appearance and change other's impressions because different hairstyles give different impressions. Thus, many people use wigs. Especially bald people that usually wear wigs in their daily life could take advantage of the wide variety of functions that are provided by the wearable computing device proposed herein. However, other conceivable appliances are film or playing actors that commonly use wigs to play different roles. Also, many so-called "cosplayers" (costume players: a form of role-play) wear wigs and costumes to imitate their favourite characters in comics and animated films. In all cases, users wear wigs to enhance their appearance. However, it is to be noted that the wearable computing device proposed herein may be worn by any people, even by people who usually do not wear wigs.

It shall be pointed out that the term "wig" according to the present disclosure refers to any type of wig that may be arranged or worn on the head of a user, either replacing natural hair or in addition to natural hair. The term "wig" shall not be limited to any specific type, shape, color or any other special characteristic of such a wig. A wig shall herein be understood as a head of hair or parts of it, independent from the type of hair. The hair itself could, for example but not limited to that, be made from horse hair, human hair, wool, feathers, yak hair, buffalo hair or any kind of synthetic material.

The herein presented wearable computing device is introduced by the applicant under the name "SmartWig". It focuses, but is not limited to applications such as different types of sensing, navigation and/or presentation. The SmartWig integrates different types of computational functions within a wig, leading to a smart and intelligent type of wig that has so far not been known.

Referring now to the drawings, wherein like reference numerals designate identical or corresponding parts throughout the several views, FIGS. 1 and 2 schematically show an application of a wearable computing device 10 according to the present disclosure in a side view (FIG. 1) and a back view (FIG. 2). The wearable computing device 10 comprises a wig 12 that is adapted to cover at least a part of the head of a user 14. Form, size and shape of the wig 12 may also be adapted to cover the entire head area of the patient 14. The wig 12 may lie against the head and/or real hair of the user 14 in large regions of the head. This provides the possibility of close contact in many different regions of the head of the user 14. In contrast to other headgears, such as e.g. hats or caps, the wig 12 has a direct and very close contact to the head of the user 14. The wearable computing device 10 further comprises at least one sensor 16 for providing input data. The at least one sensor 16 is arranged in the wig 12 and at least partly covered by the wig 12 in order to be visually hidden during use. In other words, the sensor 16 is embedded in the wig 12. Depending on the specific application, the at least one sensor 16 may be arranged at any specific point on or within the wig 12. Depending on the application, the wearable computing device 10 may comprise a plurality of sensors 16 that are arranged on, in or within the wig 12. A sensor 16 may be any type of electrical or mechanical component that senses, measures and/or provides input data. Practical examples for such sensors 16 will be given below.

Figure 6:
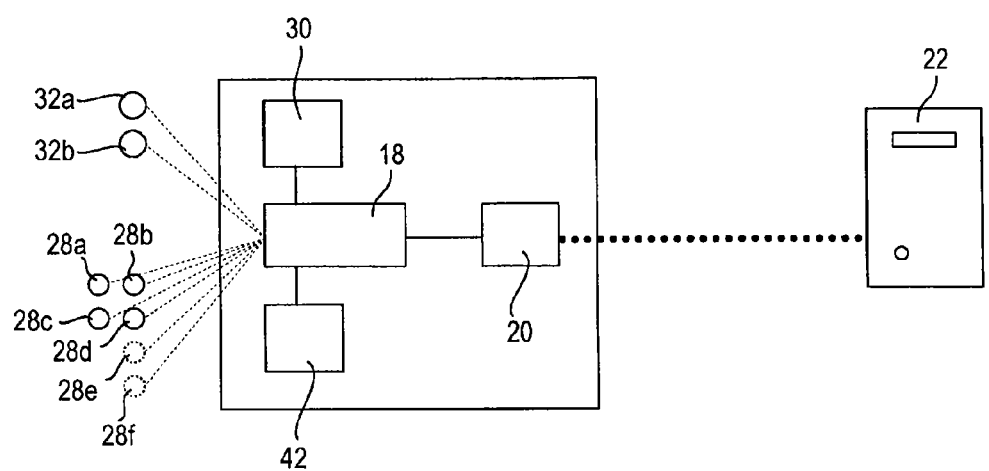
FIG. 6 shows a schematic diagram of the second embodiment of the wearable computing device according to the present disclosure.
Figure 7:
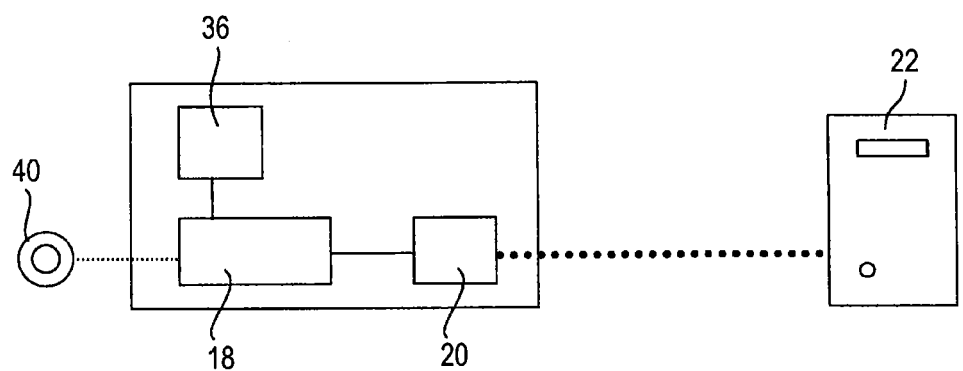
FIG. 7 shows a schematic diagram of a third embodiment of the wearable computing device according to the present disclosure.

The wearable computing device 10 further comprises a processing unit 18 that is coupled to the at least one sensor 16 for processing said input data. The processing unit 18 may include, but is not limited to, a microcontroller, a microcomputer, a microchip or any other type of processing unit that is adapted to carry out instructions of a computer program to perform arithmetical, logical and input/output operations. Even further, the wearable computing device 10 comprises a communication interface (also referred to as communication unit or communication interface unit) 20. This communication interface 20 is coupled to the processing unit 18 for communicating with a second computing device 22 (see, e.g., FIGS. 5-7). The communication interface unit 20 may, for example, be realized as a radio transceiver, Wi-Fi transceiver, WLAN-interface, Bluetooth-interface or an infrared interface. However, also other types of communication interfaces are generally conceivable without departing from the scope of the present disclosure. In a practical appliance an xBee module has been used as communication interface unit 20.

The at least one sensor 16, the control unit 18 and the communication interface 20 are all arranged in the wig 12 and at least partly covered by parts of the wig 12 in order to be visually hidden during use. In other words, the above-mentioned components 16, 18, 20 of the wearable computing device 10 are covered and hidden by the wig 12. As a result, these components are not seen and the appearance of the user 14 wearing the wearable computing device 10 keeps natural. As it is exemplarily shown in FIG. 2, the components 16, 18, 20 (the at least one sensor 16, the processing unit 18 and the communication interface 20) are preferably placed under the wig 12, e.g. on the back head of the user 14. The wig 12 comprises a plurality of natural and/or artificial hair pieces 24 which cover and visually hide the at least one sensor 16, the control unit 18 and the communication interface 20. The at least one sensor 16, the control unit 18 and the communication interface 20 may thereto, for example, be arranged on a printed circuit board 26 which circuit board 26 is arranged or integrated within the wig 12. However, it is to be noted that the components 16, 18, 20 not necessarily need to be arranged on such a printed circuit board 26. Especially the at least one sensor 16 may be arranged separately on, in or within the wig 12 at any various position, depending on the application.

As already stated above, the wearable computing device 10 may comprise several sensors 16 that are connected to the processing unit 18 either hard-wired or through a wireless communication. The processing unit (microcontroller) 18 is adapted to communicate with the second computing device 22, which second computing device 22 is locally separated from the wearable computing device 10. The communication between the processing unit 18 and the second computing device 22 is preferably realized as wireless communication; however, the connection may also be hard-wired. The second computing device 22 (e.g. a PC) works as the server and can process and interchange data also to other client devices, such as smart phones or PDAs. In this way, the wearable computing device 10 may communicate with several client devices and may control these devices or be controlled by these devices, e.g. to treat a database and/or to control a visualization tool (as will be explained below).

Figure 5:
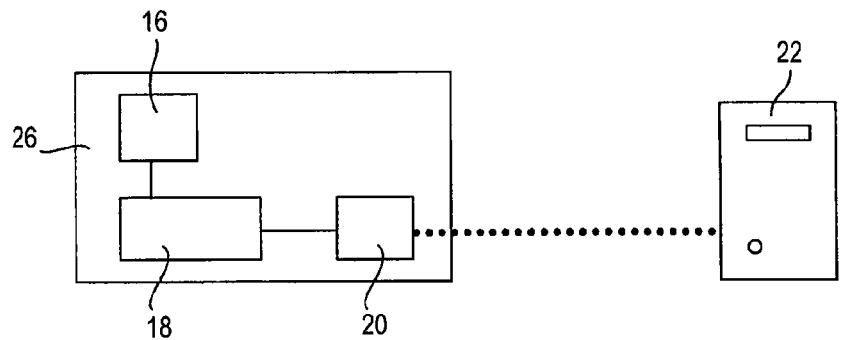
FIG. 5 shows a schematic diagram of the first embodiment of the wearable computing device according to the present disclosure.

The wearable computing device 10 according to the present disclosure has several advantages over state of the art wearable computing devices: First, due to the integration in the wig 12 a natural appearance is realized, thereby increasing the user comfort in a practical and also psychological aspect. The computational components 16, 18 and 20 of the computing device 10 are hidden and cannot be seen by other people in the surrounding. The wearable computing device 10 therefore allows to produce surprising effects without being seen. Secondly, the proposed wearable computing device 10 allows for very sensitive sensing and sensitive user feedback, since it is integrated into a wig 12 that is adapted to be worn on the user's head, which is a much more sensitive area than e.g. the foot, the hand or waist of the user 14. Thirdly, the proposed wearable computing device 10 has the advantage that the user 14 can instantly change his/her appearance just by changing the type, shape and/or color of the wig 12. FIG. 5 illustrates the general design again in a schematic diagram.

Figure 4:
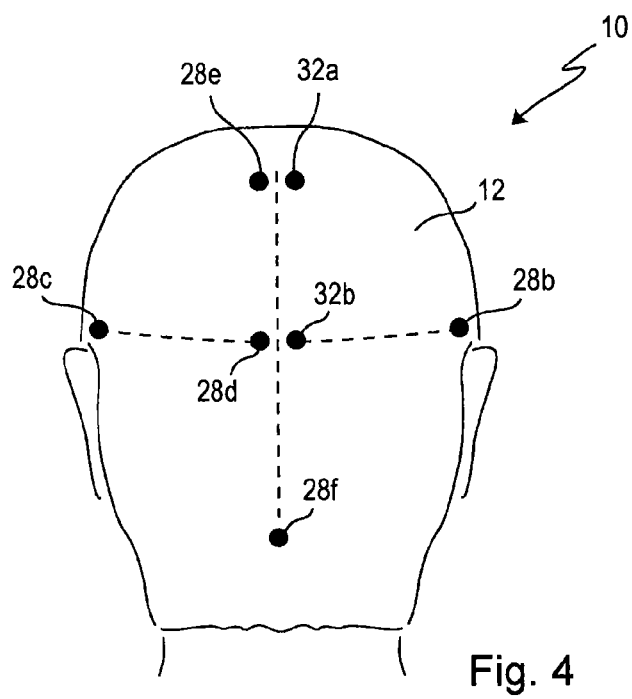
FIG. 4 shows a schematic back view of an application of the second embodiment of the wearable computing device according to the present disclosure.

According to an embodiment of the present disclosure shown in FIGS. 3 and 4, the wearable computing device 10 may be applied for location awareness. This embodiment could, for example, be denoted as "navigation wig".

According to this embodiment, the wearable computing device 10 may comprise a first actuator 28a for providing tactile signals and/or tactile feedback signals to the user 14. The processing unit 18 is adapted to generate output signals for controlling said first actuator 28a. Similar as the at least one sensor 16 explained above, the first actuator 28a is preferably arranged in the wig 12 and at least partly covered by the wig 12 in order to be hidden during use. Also similar as explained before, the connection between the first actuator 28a and the processing unit 18 may either be a hard-wire or a wireless connection. The first actuator 28a can, for example, be realized as a vibration motor that is arranged at a specific position in the wig 12, which position is adapted to be close to the skin of the head of the patient 14 when the wearable computing device 10 is used, i.e. when the wig 12 is worn on the user's head. Through this first actuator (vibration motor) 28a the wearable computing device 10 may support the location awareness of the user 14 with intuitive feedback signals. The vibration motor 28a may, for example, be used to give the user 14 any sign or warn him/her in a specific situation.

Preferably, the wearable computing device 10 comprises at least three further actuators 28b-d for providing tactile feedback signals to the user. These at least three further actuators 28b-d are also connected to the processing unit 18, and the processing unit 18 is adapted to generate output signals for controlling said at least three further actuators 28b-d. Similar as the first actuator 28a, the at least three further actuators 28b-d are arranged in the wig 12 and at least partly covered by the wig 12 in order to be visually hidden during use.

As illustrated in FIGS. 3 and 4, the first actuator 28a and the at least three further actuators 28b-d are arranged in a cross-like pattern, wherein one actuator is arranged on each side of the wig 12, on a front side (first actuator 28a), on a back side (actuator 28d), a left side (actuator 28c) and on a right side (actuator 28b) of the wig 12. Each of the four actuators 28a-d, therefore, represents one geographic direction and/or orientation. By using four actuators that are arranged at the explained distinctive points of the wig, the user 14 can be guided simply by intuitive feedback of these actuators 28a-d. A vibration of the first actuator 28a could, for example, indicate that a user should walk or move straightforward. In contrast thereto, a vibration of the actuator 28d could indicate that the user 14 should stop, slow down or move backwards. Lastly, a vibration of the two laterally arranged actuators 28b, c could indicate that the user 14 should turn right or left.

The four actuators 28a-d can therefore be used as a kind of remote control for the user 14. Different practical applications for this embodiment are conceivable. The proposed wearable computing device 10 could, for example, be used to direct blind people, e.g. to help blind people to navigate without any other further help. The gaming industry or any type of virtual reality appliance could also be an interesting field of use for the proposed wearable computing device 10. The directional information that are used to trigger the four actuators 28a-d may in this embodiment be inputted in the second, external computing device 22. A remote user may, for example, manually input directional instructions for the user 14 that are wirelessly transmitted to the proposed wearable computing device 10 and translated by the processing unit 18 into the explained vibrational/tactile feedback signs for the device user 14.

The tactile feedback or tactile indications provided by the actuators 28a-d may be realized in various ways, e.g. through vibration or also smaller electric shocks. In the first prototype versions of the applicant, vibration motors have been used that are usually used in cell phones. The vibration provided by these vibration motors is not too strong, in order to maintain the user comfort and not to induce a health risk for the user 14. The rotations per minute (RPM) of the actuators 28a-d could, for example, be set in a range around 13,000 rpm, wherein the actuators 28a-d and the vibration pattern could be controlled with analog values (from 1 to 255 levels). Since the head area is very sensitive to feedback, users wearing the proposed wig 12 can sense feedback even if it is very weak. Therefore, very small, low-energy consuming actuators 28a-d may be used.

As illustrated in FIGS. 3 and 4, the wearable computing device 10 may, furthermore, comprise a fifth and a sixth actuator 28e, f that are arranged on an upward and downward position of a back head part of the wig 12. In the navigation scenario described above, these two extra motors could, for example, be used to navigate the user 14 up and/or down stairs. Using all six actuators 28a-f, therefore, allows to navigate the user 14 with tactile feedback signals in a very variable and intelligent way, wherein the actuation of each actuator 28a-f indicates different directional information.

As explained above, the directional information can be inputted into the second, external computing device 22 and wirelessly communicated (via the communication interface 20) to the wearable computing device 10.

However, according to a further embodiment, it is preferred to use a GPS sensor 30 (see, e.g. schematical illustration in FIG. 6) for providing position and location information. In other words, according to this embodiment, the at least one sensor 16 comprises a GPS sensor 30 or is realized by a GPS sensor 30, respectively. The control unit 18 may in this case be adapted to evaluate the position and location information provided by the GPS sensor 30 and to control the actuators 28a-f to provide tactile feedback signals to the user 14 according to the evaluated position and location information in order to provide the user 14 with navigation information.

The GPS sensor 30 itself may also be hidden at any distinctive position within the wig 12. Due to the connection via the communication interface 20 to the second, external computing device 22, which acts as server PC, the server PC 22 knows both, the user's position and location information, so the user 14 can receive intuitive feedback via the actuators 28a-f navigating him/her to a desired destination. The computing device 10 in this case acts as independent navigation system that may be worn on the user's head in the form of the wig 12 described above. Due to the hidden sensors 16, 30 and actuators 28a-f under or within the wig 12 people in the surrounding do not recognize this navigation system. Especially for blind people this may be of great help. Although navigation systems based on vibration motors have been widely introduced, a navigation system integrated into a wig 12 is so far not known.

As a further improvement of this so-called "navigation-wig-embodiment", the wearable computing device 10 may furthermore comprise an ultrasound transducer 32a, 32b that is coupled to the processing unit 18 for transmitting and/or receiving ultrasound waves to detect an object in a surrounding of the wig 12. It is to be noted that, depending on the application, more than one or a plurality of ultrasound transducers 32 may be integrated into the wig 12. In the example illustrated in FIG. 4, two ultrasound transducers 32a, b are provided. These ultrasound transducers 32a, b may, for example, be arranged on the back head part of the wig 12. The ultrasound transducers 32a, b may monitor the surrounding in the back of the user's head using known ultrasound-based distance measurement techniques. The provision of ultrasound transducers 32a, b, therefore, allows to warn the user 14 if any obstacles occur in his/her back and/or above his/her head. In case an obstacle occurs in these areas, a warning signal may be provided as tactile feedback via one of the actuators 28a-f.

Moreover, it is possible to use the proposed wearable computing device 10 for communication. A small video camera (also referred to as camera sensor) 34 can be attached or embedded into the wig 12 (see e.g. FIG. 3). In other words, the at least one sensor 16 in this embodiment comprises a camera sensor 34 that is coupled to the processing unit 18 for delivering image information from the surrounding of the wig 12. As the wearable computing device 10 preferably contains a Wi-Fi module 20 as explained above, a remote user can send vibration commands through the network by checking the images provided by the video camera (camera sensor) 34. The remote user can thus navigate the wig user 14 manually to a desired destination. The remote user can control a wig user 14 with forward, backward, right, left, upward and downward commands as explained above using the vibration actuators 28a-f. Moreover, if another user wears a similar wearable computing device 10 as proposed according to this disclosure, a wig-to-wig communication is possible as this is known from other touch systems. If one user touches one of his/her vibration motors 28a-f, the other users equivalent motor may vibrate.

In this embodiment, the wearable computing device 10 may furthermore comprise a wig position sensor 42 that is coupled to the processing unit 18 for providing position data including information of a position of the wig 12 relative to a reference position on the user's head. This wig position sensor 42 may, for example, be realized by an electric compass or an optical sensor that can retrieve information about the place of the wig 12 relative to the user's head. This sensor 42 may, thus, measure whether the wig 12 is placed correctly on the "right" place on the user's head.

A further practical application of the proposed wearable computing device 10 is the usage for presentation appliances. A corresponding embodiment is schematically shown in the diagram illustrated in FIG. 7. According to this embodiment, the at least one sensor 16 comprises or is realized as a switch button 36. Similar as the other sensors explained above, the switch button 36 is preferably connected to the processing unit 18 either via a hard-wire or a wireless connection. The switch button 36 may be adapted to provide controlling signals to control the second computing device 22, wherein the second computing device 22 in this case preferably comprises a visual presentation device (e.g. a monitor, a screen and/or a beamer). The switch button 36 may be arranged on a side portion of the wig 12, e.g. under or within the sideburns 38 of the wig 12. It is to be noted that the switch button 36 may also be arranged at any other position on or within the wig 12. In a practical appliance it is preferred to have at least two switch buttons 36, e.g. one on or under each sideburn 38 of the wig 12.

Needless to say, in a presentation the speaker's physical appearance is an important element, so the wearable computing device 10 proposed herein also works effectively for presentations. As explained, the wig 12 contains one or more buttons 36 and is connected to a computer 22, so it can be used not only to enhance the appearance of the user 14, but also to control an external computer 22. Generally, people use a simple pointing device or a remote controller. The wig 12 proposed herein contains these control units in itself, so a user 14 can manipulate the presentation computer 22 by simply touching the wig 12.

Although presentations are one of the most important elements in modern business, the style has not undergone any significant changes. The system proposed herein provides original hardware to enhance presentations. In the embodiment exemplarily shown in FIGS. 3 and 7, one or two switch buttons 36 may be provided under the sideburns 38 of the wig 12, and the one or more buttons 36 are connected to the external computer 22 via a wireless connection (using the Wi-Fi module 20). During a presentation the user 14 may, for example, move forward or backward through presentation slides by simply pushing the sideburns 38, i.e. by pushing the one or more buttons 36. Thus, the user 14 can control the presentation slides simply by natural behavior like touching side burns 38. Additionally, the wearable computing device 10 may comprise a laser pointer 40 that is arranged in or on the wig 12 (see e.g. FIG. 3). The laser pointer 40 may, for example, be arranged on a forehead part of the wig 12, so that the user 14 may point out relevant information on the projected slide in the above-explained presentation mode. Moreover, a mouse pointer (not shown) may be set on the back of the head of the user 14, so that the user 14 can control the external computer 22 remotely and move around freely.

Instead of making use of one or more switch buttons 36 as explained above it would be generally also conceivable to use other sensors, like motion or pressure sensors or strain gauges to measure the motion of the user's head and/or to measure specific gestures or facial expressions of the user 14. In this case, the user 14 may also control the external computing device 22 or any other type of external computing apparatus (a mobile computer, a desktop PC, a PDA or a smart phone) simply by gestures, facial expressions or mimic. In the above-illustrated presentation scenario, the user 14 could, for example, move to the next presentation slide or back to the preceding presentation slide by simply raising his/her eyebrows.

The herein presented SmartWig may be applied in many daily life situations. Several other practical appliances are generally conceivable. It is to be noted that the above given examples are not restrictive. The proposed wearable computing device 10 has been demonstrated several times in internal meetings of the applicant. Several presentations using the wearable computing device 10 according to the present disclosure have been given in both, casual and formal environments. In the casual presentations, the wig 12 received very good reactions because the presenter's appearance was quite interesting, since audience members knew his/her normal appearance. Thus, the gap between normal and wig-wearing appearances was fun. Moreover, in the formal presentations by using the wig 12 the atmosphere during the presentation was warm, and audience was more interested in the wig 12 than in the presentation contents. In both cases, the appearance of the presenter with the wig 12 had a strong impact. On the other hand, from the viewpoint of the presenter, the presented wearable computing device 10 gave the presenter the feeling that they could give their presentation with a different character and mind set. As a result, the presenter may not be nervous, but relaxed. Similar positive feelings could occur when the wearable computing device 10 is worn by an actor who plays different characters in movies and plays.

Generally, in presentations many people use the same software (e.g. Power Point and/or Keynote), so presentation formats and visualization methods are almost always the same, although hardware to enhance presentation is simple and quite limited. Many people use simple hardware such as laser pointers and a small controller to manipulate presentation slides. This is just a tool to support computer manipulation, so it is not really useful in terms of producing an effective presentation. The wearable computing device 10 proposed herein may change this significantly and, therefore, have the ability to improve the effectiveness of future presentations significantly.

Another issue that has been considered by the wearable computing device 10 is that the head is more sensitive than a foot or waist. In the navigation wig scenario presented above the user 14 may feel the feedback and find which motor works in a clear and concise manner. As explained above, the system may use six vibration motors 28a-f for every direction. Especially, the two feedback motors 28e, f received good reactions in the first test trials, because these two motors 28e, f were really unique and are able to navigate users up an down stairs. On the other hand, the vibration feedback of the actuators 28a-f is not painful and only little troublesome, because the head is very sensitive. Although the vibration feedback can be made weaker, it is necessary to personalize the feedback strength.

A further advantage lies in the fact that the head area which is used for sensing and tactile feedback according to the present disclosure receives less shocks than other body parts, such as hand and foot, in daily life, because the head has little opportunities to touch objects and people instinctively protect their head. Thus, the system can avoid breaking down by colliding with other objects, so the user can use the system sustainably. Moreover, it has been shown above that the presented wearable computing device 10 may be applied for communication and presentation appliances. A small video camera can be attached onto the system, and the system can contain Wi-Fi modules, so a remote user can send vibration commands through the network by checking video camera images.

In contrast to using a cap or a hat, the integration into a wig mainly has the advantage that it is less obtrusive and serves for a quite natural look and feel. However, the above-mentioned components of the wearable computing device 10 may also be integrated into a hat, cap or any other headgear. Wig technology improves year after year, and many companies manufacture and release new products, so wigs can be expected to look almost the same as natural hair in the near future. Therefore, it is believed that a wig as proposed herein has huge potential as a wearable computing device. Some people wear wigs to disguise the fact that they are bald. By using a wig their appearance is dynamically changed. However, they cannot be sure how other people see their hair. The presented wearable computing device 10 may contain sensors like a camera and an electric compass, so the user can retrieve such information and know whether the wig is in the right place or not, i.e. whether the wig is correctly mounted on the head or not. In addition, wigs are worn by individuals who experiences hair loss due to medical reasons. For instance, people who use an anticancer drug often use wigs, because hair loss is a side effect. For them healthcare is also probably more important than appearance. The wearable computing device 10 proposed herein works for both appearance and healthcare simultaneously.

A further interesting approach could be combining artificial muscles and the wig. Artificial muscles look like hair, so it is useful for hair extensions and fake moustaches. If a user is excited, the hair dynamically changes. Thus, by using the wig 12 proposed herein, the user's appearance becomes more dynamic. The wearable computing device 10 according to the present disclosure preferably covers the entire head, so it could be also combined with brain waves, similar as proposed in J. R. Wolpaw, at al: "Brain-computer interfaces for communication and control", Clin.Neurophysiol., Vol. 113, pp. 767-791, 2002. In such a combination, the proposed system could provide interactions that are even more natural.

By combining different kinds of sensors, the presented wig 12 could also be useful to detect human information such as brain wave, temperature, pulse, blood pressure, sweat, and head tracing and environment information such as image, sound, humidity, temperature, and density of $CO_2$. The environment information is useful to detect human activities such as where the user went and how to go there. From the data, users can know their trend of actives. Moreover, the human information is useful for health care. Especially, blood pressure is connected serious health problem. The system can detect these kinds of data naturally and transmit them to the server computer 22.

Obviously, numerous modifications and variations of the present disclosure are possible in light of the above teachings. It is therefore to be understood that within the scope of the appended claims, the disclosure may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

CROSS-REFERENCE TO RELATED APPLICATIONS

The present application claims priority of EP patent application No. 12 168 328.8 filed on 16 May 2012, the entire contents of which are incorporated herein by reference.

The invention claimed is:
1. A wearable computing device, comprising:
a wig that covers at least a part of a head of a user;
at least one sensor configured to provide input data;
a first actuator configured to provide tactile feedback signals to the user;

a processing circuit that is coupled to the at least one sensor, the processing circuit configured to process said input data and generate output signals for controlling the first actuator; and a communication circuit that is coupled to the processing circuit, the communication circuit configured to communicate with a second computing device, wherein the at least one sensor, the processing circuit, the communication circuit and the first actuator are arranged in the wig and at least partly covered by the wig so as to be visually hidden during use of the wig.

2. The wearable computing device according to claim 1, wherein the wig includes a plurality of natural and/or artificial hair pieces which cover and visually hide the at least one sensor, the processing circuit and the communication circuit.

3. The wearable computing device according to claim 1, wherein the communication circuit is configured to wirelessly communicate with the second computing device, the second computing device being locally separated from the wearable computing device.

4. The wearable computing device according to claim 1, further comprising at least three further actuators for providing tactile feedback signals to the user, wherein the processing circuit is configured to generate output signals for controlling said at least three further actuators,
said at least three further actuators are arranged in the wig and at least partly covered by the wig in order to be visually hidden during use, and
said first actuator and said at least three further actuators are arranged in a cross-like pattern, wherein one actuator is arranged on each side of the wig, on a front, a back, a left and on a right side of the wig.

5. The wearable computing device according to claim 1, wherein the processing circuit is configured to generate output signals for controlling said first actuator and/or said at least three further actuators to provide tactile feedback signals depending on data received from the second computing device.

6. The wearable computing device according to claim 1, wherein the at least one sensor includes a GPS sensor configured to provide position and location information.

7. The wearable computing device according to claims 1, wherein the processing circuit is configured to evaluate said position and location information and to control said first actuator and/or said at least three further actuators to provide tactile feedback signals to the user according to the evaluated position and location information to provide the user with navigation information.

8. The wearable computing device according to claim 1, wherein the at least one sensor includes an ultrasound transducer coupled to the processing circuit, the ultrasound transducer configured to transmit and/or receive ultrasound waves to detect an object in a surrounding of the wig.

9. The wearable computing device according to claim 1, wherein the at least one sensor includes a camera sensor that is coupled to the processing circuit, the camera sensor configured to deliver image information from the surrounding of the wig.

10. The wearable computing device according to claim 1, wherein
the at least one sensor includes a switch button configured to generate controlling signals to control the second computing device, and
the second computing device includes a visual presentation device.

11. The wearable computing device according claim 1, further comprising a laser pointer that is arranged in or on the wig.

12. The wearable computing device according to claim 1, wherein the at least one sensor includes a remote control configured to control the second computing device.

13. The wearable computing device according to claim 1, wherein the at least one sensor includes a wig position sensor that is coupled to the processing circuit for providing positioning data including information of a position of the wig relative to a reference position on the user's head.

14. A system comprising:
a wearable computing device coupled to a wig that covers at least a part of a head of a user, the wearable computing device including:
at least one sensor configured to provide input data;
a first actuator configured to provide tactile feedback signals to the user;
a processing circuit that is coupled to the at least one sensor, the processing circuit configured to process said input data and generate output signals for controlling the first actuator; and
a communicating circuit that is coupled to the processing circuit, the communication circuit configured to communicate with the second computing device, the at least one sensor, the processing circuit, the control circuit, the communication circuit and the first actuator being arranged in the wig and at least partly covered by the wig so as to be visually hidden during use of the wig; and
the second computing device configured to transmit and/or receive control data to and/or from the wearable computing device, the second computing device being locally separated from the wearable computing device.

* * * * *